US010909986B2

(12) United States Patent
Trim et al.

(10) Patent No.: US 10,909,986 B2
(45) Date of Patent: Feb. 2, 2021

(54) ASSESSMENT OF SPEECH CONSUMABILITY BY TEXT ANALYSIS

(71) Applicant: International Business Machines Corporation, Armonk, NY (US)

(72) Inventors: Craig M. Trim, Glendale, CA (US); John M. Ganci, Jr., Durham, NC (US); Anna Chaney, Austin, TX (US); Stefan Van Der Stockt, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 16/204,994

(22) Filed: Nov. 29, 2018

(65) Prior Publication Data

US 2020/0175974 A1 Jun. 4, 2020

(51) Int. Cl.
*G10L 15/22* (2006.01)
*G10L 15/02* (2006.01)
*G10L 13/00* (2006.01)

(52) U.S. Cl.
CPC .............. *G10L 15/22* (2013.01); *G10L 13/00* (2013.01); *G10L 15/02* (2013.01); *G10L 2015/027* (2013.01)

(58) Field of Classification Search
CPC ...... G06F 17/30684; G09B 19/04; G09B 5/02
See application file for complete search history.

(56) References Cited

U.S. PATENT DOCUMENTS

| 9,436,681 | B1* | 9/2016 | Tunstall-Pedoe | ....... G06F 40/51 |
| 9,760,607 | B1* | 9/2017 | Tweedy | ................ G06F 40/253 |
| 9,916,380 | B2 | 3/2018 | Byron et al. | |
| 10,594,757 | B1* | 3/2020 | Shevchenko | ........... G06F 40/35 |
| 2009/0197225 | A1* | 8/2009 | Sheehan | ............... G09B 17/003 434/169 |
| 2010/0153425 | A1* | 6/2010 | Tulchinsky | ............ G09B 19/04 707/765 |
| 2014/0229159 | A1* | 8/2014 | Branton | ................ G06F 16/345 704/9 |
| 2014/0295384 | A1* | 10/2014 | Nielson | ..................... G09B 5/00 434/157 |
| 2017/0193090 | A1* | 7/2017 | Byron | .................... G06F 40/279 |
| 2017/0287355 | A1* | 10/2017 | Pogorelik | ................ G09B 5/06 |
| 2018/0004726 | A1* | 1/2018 | Liu | ......................... G06F 16/36 |

(Continued)

OTHER PUBLICATIONS

P. Mell, et al. "The NIST Definition of Cloud Computing", NIST Special Publication 800-145, Sep. 2011, Gaithersburg, MD.

*Primary Examiner* — Anne L Thomas-Homescu
(74) *Attorney, Agent, or Firm* — James Nock, Esq.; Hye Jin Lucy Song, Esq.; Heslin, Rothenberg, Farley & Mesiti

(57) ABSTRACT

Methods, computer program products, and systems are presented. The methods include, for instance: obtaining an input text for an output speech. The number of words and syllables are counted in each sentence, and a mean sentence length of the input text is calculated. Each sentence length is checked against the mean sentence length and a variation for each sentence is calculated. For the input text, the consumability-readability score is produced as an average of variations for all sentences in the input text. The consumability-readability score indicates the level of satisfaction for the listener of the output speech based on the input text.

25 Claims, 8 Drawing Sheets

(56) References Cited

U.S. PATENT DOCUMENTS

2018/0082458 A1* 3/2018 Kaplan .................... G09G 5/00
2018/0095966 A1* 4/2018 Fourney .............. G06F 16/9535
2019/0080018 A1* 3/2019 Pilkington .......... G06F 16/9577
2019/0287142 A1* 9/2019 Fan ........................ G06F 40/30
2020/0036659 A1* 1/2020 Wu ..................... G06Q 10/107

* cited by examiner

400

```
        Paragraph B

L401:  Now listen.
L402:  I vary the sentence length, and I create music.
L403:  Music.
L404:  The writing sings.
L405:  It has a pleasant rhythm, a lilt, a harmony.
L406:  I use short sentences.
L407:  And I use sentences of medium length.
L408:  And sometimes when I am certain the listener is
       rested, I will engage him with a sentence of
       considerable length.
```

ASSESSMENT OF SPEECH CONSUMABILITY BY TEXT ANALYSIS

TECHNICAL FIELD

The present disclosure relates to natural language processing technology, and more particularly to methods, computer program products, and systems for assessing consumability of a speech that is produced by a text-to-speech tool.

BACKGROUND

Conventional tests for readability of texts are applied in many areas of life where literacy and understanding of written document is indispensable, including school textbooks, government forms, standardized exams for admissions and licenses, business documents, and various publications targeting specific readership.

Recent expansion in the technology of natural language processing, particularly a wide variety of text-to-speech tools, makes vast amount of audible texts available, including audio books, reading services for newspapers and other documents, in order to meet the demands of people having difficulty reading written texts, children learning to read, those who wish to multitask while driving, and many more. Conventional readability test and software tools implementing such tests are oriented toward texts in measuring how easily readers can read the texts. Conventional readability test is formulated based on parameters of a sentence count, a word count, and a syllable count. When producing audio product based on texts, users can perceive the speech based on a highly readable text as boring as the audio delivery make the text more or less easier to understand. Accordingly, a test suitable for audio products that can measure not only the understandability of the material but also the characteristics of the material to keep the users attentive when being heard would be desirable.

SUMMARY

The shortcomings of the prior art are overcome, and additional advantages of evaluating how interesting and understandable a certain speech product is to be based on a script of the speech are provided, through the provision, in one aspect, of a method. The method includes, for instance: obtaining, by one or more processor, an input text, where the input text is a script for an output speech; counting, by the one or more processor, a number of words in a sentence and a number of syllables in the sentence, for each sentence in the input text; calculating, by the one or more processor, a mean sentence length of the input text as an average number of words in sentences of the input text; calculating, by the one or more processor, respective variations in sentence lengths for all sentences, by subtracting the number of words in each sentence from the mean sentence length of the input text; and producing, by the one or more processor, a consumability-readability score of the input text, as an average of variations for all sentences in the input text, where the consumability-readability score indicates the level of satisfaction for the listener of the output speech based on the input text.

The shortcomings of the prior art are overcome, and additional advantages of evaluating how interesting and understandable a certain speech product is to be based on a script of the speech are provided, through the provision, in one aspect, of a computer program product. The computer program product includes, for instance: a computer readable storage medium readable by one or more processor and storing instructions for execution by the one or more processor for performing a method including: obtaining an input text, where the input text is a script for an output speech; counting a number of words in a sentence and a number of syllables in the sentence, for each sentence in the input text; calculating a mean sentence length of the input text as an average number of words in sentences of the input text; calculating respective variations in sentence lengths for all sentences, by subtracting the number of words in each sentence from the mean sentence length of the input text; and producing a consumability-readability score of the input text, as an average of variations for all sentences in the input text, where the consumability-readability score indicates the level of satisfaction for the listener of the output speech based on the input text.

The shortcomings of the prior art are overcome, and additional advantages of evaluating how interesting and understandable a certain speech product is to be based on a script of the speech are provided, through the provision, in one aspect, of a system. The system includes, for instance: a memory; one or more processor in communication with memory; and program instructions executable by the one or more processor via the memory to perform a method including: obtaining an input text, where the input text is a script for an output speech; counting a number of words in a sentence and a number of syllables in the sentence, for each sentence in the input text; calculating a mean sentence length of the input text as an average number of words in sentences of the input text; calculating respective variations in sentence lengths for all sentences, by subtracting the number of words in each sentence from the mean sentence length of the input text; and producing a consumability-readability score of the input text, as an average of variations for all sentences in the input text, where the consumability-readability score indicates the level of satisfaction for the listener of the output speech based on the input text.

Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
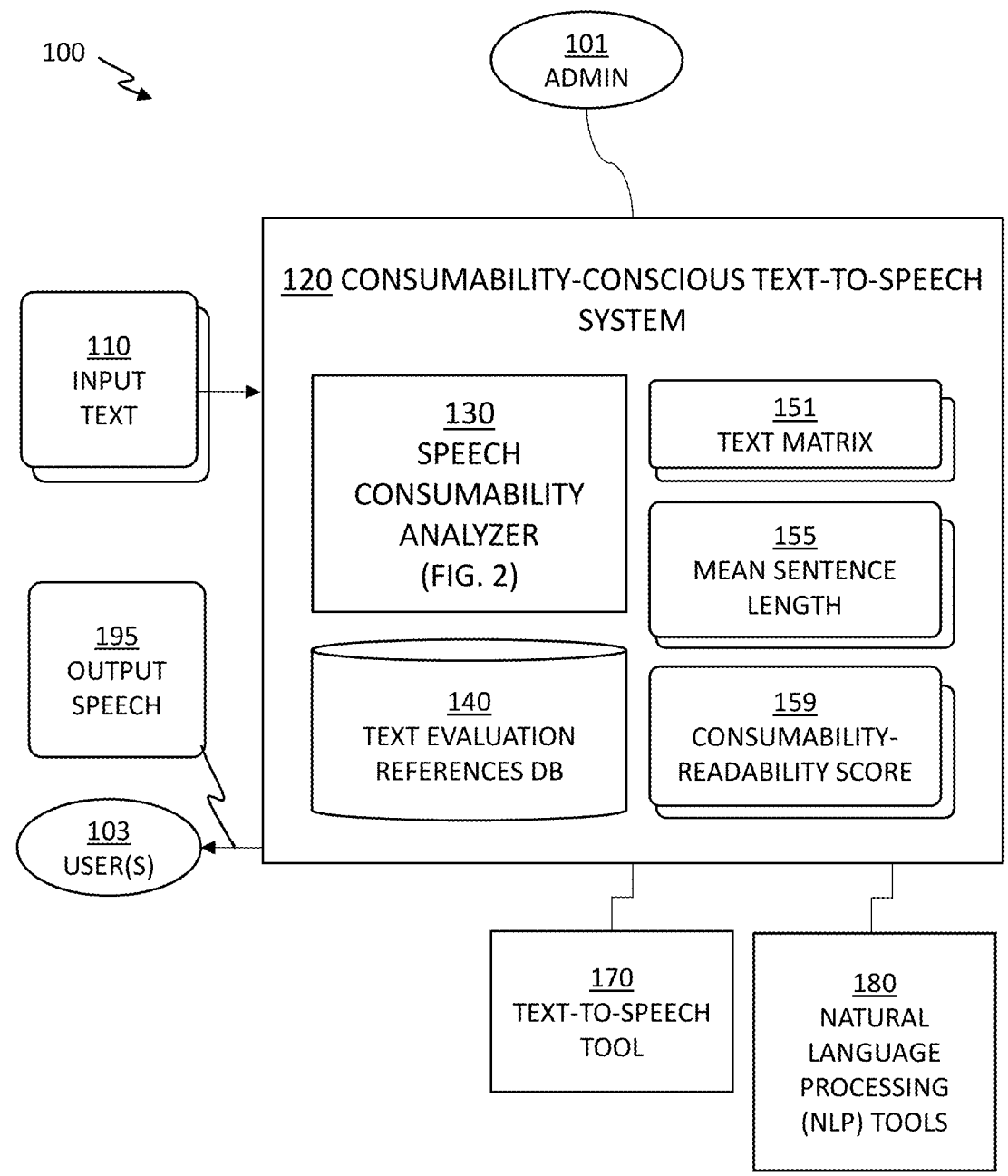
FIG. 1 depicts a system for assessing consumability of an output speech based on an input text, in accordance with one or more embodiments set forth herein.

FIG. 1 depicts a system 100 for assessing consumability of an output speech 195 based on an input text 110, in accordance with one or more embodiments set forth herein.

The system 100 includes a consumability-conscious text-to-speech (T2S) system 120. The consumability-conscious text-to-speech system 120 includes a speech consumability analyzer 130 and a text evaluation references database 140.

The speech consumability analyzer 130 obtains and processes input text 110 and calculates a consumability-readability score (CRS) 159 of the input text 110, based on the data and syllable rules corresponding to a language of the input text 110 as stored in the text evaluation references database 140. In the process of calculating the consumability-readability score 159 of the input text 110, the speech consumability analyzer 130 also generates a text matrix 151 corresponding to the input text 110 and calculates a mean sentence length 155 of the input text 110.

The term "consumability" generally focuses on positive user experience with technology solutions, and indicates a state of a certain technology solution being usable without difficulty by users 103 and being satisfactory for the users 103 with the technology solution. In this specification, particularly for the embodiments of the present invention, the term "consumability" as used in the consumability-readability score 159 of the input text 110 indicates the level of ease and satisfaction in hearing and understanding the output speech 195 based on the input text 110 as a text-to-speech product. The consumability indicates a combined concept of user-friendliness in required skills to use the output speech 195, indicating the level of vocabulary, linguistic knowledge, and listening comprehension, and the challenge to keep the users 103 interested and attentive to the output speech 195. In this specification, the term "readability" is also used to represent the ease of understanding for the output speech 195, although the output speech 195 would be heard rather than read. Respective examples of input texts 110 with a low consumability-readability score 159 and a high consumability-readability score 159 are presented in FIGS. 3 and 4 and corresponding descriptions.

The consumability-readability score 159 as calculated by the speech consumability analyzer 130 is an average level of variations in respective lengths of sentences in the input text 110. The consumability-readability score 159, intends to quantify how engaging the input text 110 can be when converted to the output speech 195 and heard by the users 103. The consumability-readability score 159 also takes the readability of the input text 110 into account by partially employing parameters conventionally used in readability tests as customized, in the process of calculating the consumability-readability score 159. Examples of parameters conventionally used in readability tests include the number of sentences in a text, the number of words in the text, and the number of syllables in the text. The text matrix 151 and the mean sentence length 155 are generated to evaluate the readability of the input text 110 as in conventional readability tests. The readability of the input text 110 would be a primary factor affecting an ease of understanding for the output speech 195 based on the input text 110, and the consumability-readability score 159 takes both the level of ease in understanding and the level of attraction of the output speech 195.

The consumability-conscious text-to-speech system 120 calculates the consumability-readability score 159 of the input text 110, and subsequently, optionally generates an output speech 195 for the users 103 based on the input text 110 according to the consumability-readability score 159 of the input text 110. The consumability-conscious text-to-speech system 120 is operatively coupled to a text-to-speech tool 170 and a natural language processing (NLP) tools 180. The consumability-conscious text-to-speech system 120 utilizes respective functionalities of the T2S tool 170 and the NLP tools 180 in combination of the speech consumability analyzer 130 in producing the output speech 195, and/or in determining whether or not the input text 110 is suitable for the users 103. Detailed operations of the speech consumability analyzer 130 are presented in FIG. 2 and corresponding description.

In certain embodiments of the present invention, the consumability-conscious text-to-speech system 120 can further optionally convert the input text 110 to a semantically similar text that corresponds to a distinctive value for the consumability-readability score 159 other than the input text 110, when the consumability-readability score 159 of the input text 110 is significantly less than a preconfigured threshold. The consumability-conscious text-to-speech system 120 can utilize the NLP tools 180 for the conversion. The consumability-conscious text-to-speech system 120 can subsequently utilizes the converted text to generate the output speech 195, in order to improve the consumability of the output speech 195.

An admin 101 of the consumability-conscious text-to-speech system 120 configures and supervises the operations of various data and processing components of the consumability-conscious text-to-speech system 120. A few responsibilities of the admin 101 include, but are not limited to, selecting criteria for the input text 110, selecting and directly providing the input text 110, setting a threshold for a certain level of consumability of the output speech 195 as assessed by the consumability-conscious text-to-speech system 120, and establishing and maintaining contents of the text evaluation references database 140. Certain responsibilities of the admin 101 with regard to the operations of the consumability-conscious text-to-speech system 120 such as establishing and maintaining contents of the text evaluation references database 140 can be automated by use of automatic access to various data sources for the input text 110 and text evaluation references and data mining.

Embodiments of the present invention recognize that conventional tests for readability of texts that are commonly used in present environment is a scale measuring the level of ease for the readership in reading a certain text. Government agencies, businesses, and in the field of education, the readability tests are performed regularly in authoring and distributing written materials because it is imperative that the information in the written material can be understood by the target readership, such as instruction manuals, business contracts, school textbooks, etc. One of the widely used tests is the Flesch reading-ease test based on the Flesch reading-ease score (FRES) that is calculated according to the formula below:

$$FRES = 206.835 - 1.015\left(\frac{\text{total words}}{\text{total sentences}}\right) - 84.6\left(\frac{\text{total syllables}}{\text{total words}}\right)$$

Embodiments of the present invention recognize that the FRES formula is calibrated that higher scores for texts indicate that the texts are easier to read, and that lower scores for texts indicate that the texts are difficult to read. The FRES scale ordinarily ranges between zero (0.0) to one hundred (100.00), and scores between 100.00-90.00 indicate the text being very easy to read and suitable for average fifth grader/eleven-year-old student; scores between 90.0-80.0 indicate the text being easy to read and suitable for average sixth grader and conversational English for consumers in general public; and scores less than 50.0 indicate that the text being difficult to read and suitable for college students or with more education. The FRES does not have a theoretical lower bound, and some sentences scored less than (−500) in a certain sophisticated literature are known. Use of the FRES scale is so ubiquitous and many NLP solutions implement the FRES scale.

Embodiments of the present invention recognize that another conventional readability test that is more extensively in the field of education is the "Flesch-Kincaid Grade Level Formula", which is calibrated a score as a United States grade level of K-12 system. The FK grade level formula also utilizes parameters of $$\left(\frac{\text{total words}}{\text{total sentences}}\right),$$

that is, an average sentence length in a number of words, and $$\left(\frac{\text{total syllables}}{\text{total words}}\right),$$

indicating an average number of syllables per word, as in the FRES formula. The FK grade level formula for a text is calibrated to indicate a number of years of education that is required to understand the text, and the FK grade level score does not have a theoretical upper bound, indicating that the text can be extremely difficult to understand regardless of the years of education of the reader.

Embodiments of the present invention recognize that both FRES and FK scales, although distinctively calibrated, share the characteristics of the tests in that both scales measure the readability of texts based on the average sentence length in words and the average number of syllables per words of the texts, primarily focusing on the average numbers across the entire text. Embodiments of the present invention also recognize that due to the aforementioned formulations on the average sentence length and the average word length, the two aforementioned FRES and FK scales can measure only how easy to read the text is as a whole, without considering how engaging the text is for a reader to read sentence by sentence. The consumability-readability score 159 employed in the embodiments of the present invention intends to quantify how engaging the input text 110 is, particularly in terms of progression from sentence to sentence in the text.

Figure 2:
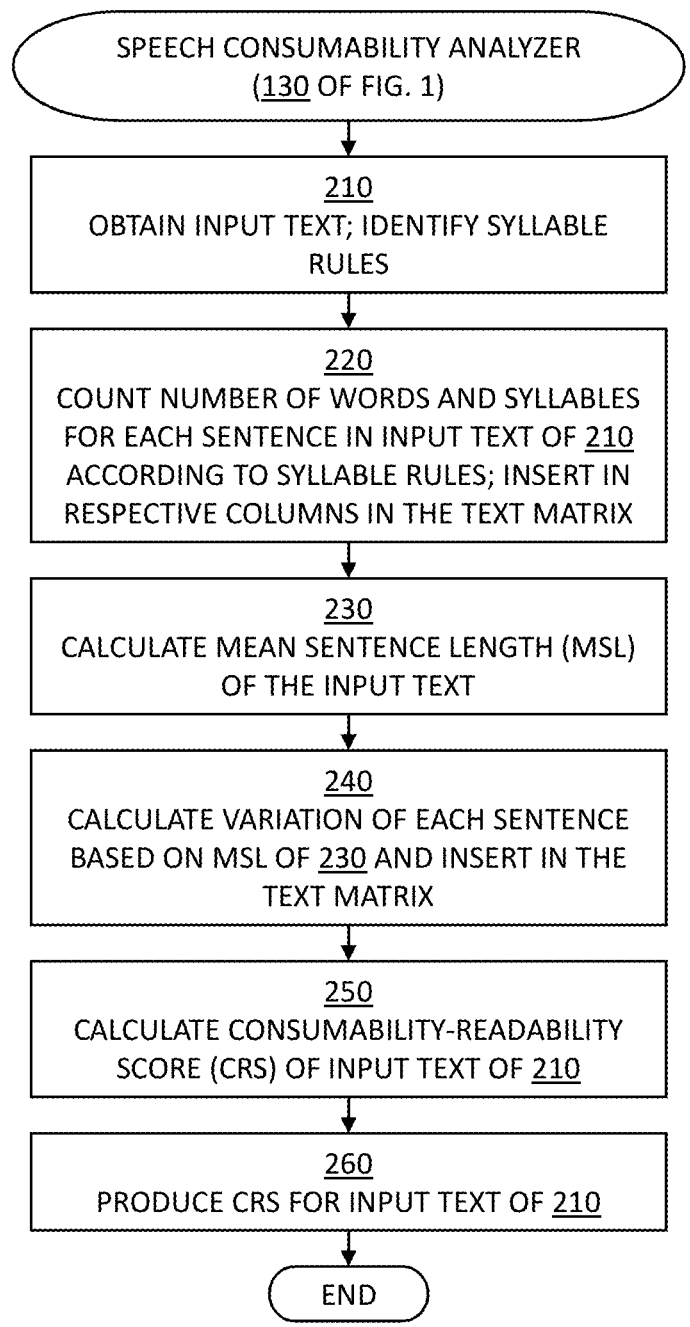
FIG. 2 depicts a flowchart for the speech consumability analyzer, in accordance with one or more embodiments set forth herein.

FIG. 2 depicts a flowchart for the speech consumability analyzer 130, in accordance with one or more embodiments set forth herein.

In block 210, the speech consumability analyzer 130 obtains the input text 110 including a plurality of sentences. The speech consumability analyzer 130 identifies syllable rules to apply in processing the input text. Then, the speech consumability analyzer 130 proceeds with block 220.

In certain embodiments of the analyzer 130 accepts any free format text of a supported language as the input text 110 to test the speech consumability. In the same embodiments of the present invention, the syllable rules are predefined corresponding to the supported language in which the input text 110 is authored. Embodiments of the present invention recognize that the input text 110 is within the bounds of the language in which the input text 110 is written, and that the input text 110 includes one or more sentence separated by punctuation marks or any other symbol, according to the syntax of the language of the input text 110.

In one embodiment of the present invention, the input text 110 is in English language, and the syllable rules for the input text 110 specify that: 1) each word is separated by a space and the number of syllables are counted for each word; 2) count the number of vowels ('a', 'e', 'o', 'u'), middle and ending 'y's, and '-thm'/'-sm', in a word; 3) decrease one from the number of vowels for each double vowel; 4) decrease one from the number of vowels if the word ends with a vowel or if the word is combined and has a component ending with a vowel; and 5) the resulting number is the number of syllables for the word. In the same embodiment of the present invention, the syllable rules are stored in the text evaluation references database 140 and/or configured to operate for the speech consumability analyzer 130.

In block 220, the speech consumability analyzer 130 parses the input text 110 and counts, for each sentence in the input text 110, the number of words in the sentence and the number of syllables in the sentence, according to the syllable rules identified in block 210. The speech consumability analyzer 130 also counts the number of sentences in the input text 110 while processing the sentences. The speech consumability analyzer 130 subsequently fills in the first column of the text matrix 151 with the number of words in the sentence, and the second column of the text matrix 151 with the number of syllables in the sentence. Then, the speech consumability analyzer 130 proceeds with block 230.

In certain embodiments of the present invention, the speech consumability analyzer 130 utilizes the text matrix 151 to represent parameters extracted from the input text 110 that affect the consumability-readability score (CRS) 159. In the same embodiments of the present invention, each sentence of the input text 110 is represented as a row of the text matrix 151, in order of appearance in the input text 110. Accordingly, when the input text 110 has N number of sentences, the text matrix 151 corresponding to the input text 110 has N number of rows, and the j-th sentence in the input text 110 is represented as the j-th row in the text matrix 151. In the same embodiments of the present invention, the text matrix 151 has four (4) parameters in respective columns to represent each sentence as configured below.

The first column of the text matrix 151 indicates a number of words in the sentence represented by the row, that is, TM[j][1]=(Number of words)$_j$, for the j-th sentence of the input text 110.

The second column of the text matrix 151 indicates a number of syllables in the sentence represented by the row, that is, TM[j][2]=(Number of syllables)$_j$, for the j-th sentence of the input text 110.

The third column of the text matrix 151 indicates an average number of syllables per word in the sentence represented by the row, that is, $$TM[j][3] = (\text{Number of syllables per word})_j = \left(\frac{TM[j][2]}{TM[j][1]}\right),$$

for the j-th sentence of the input text 110. Values between one (1) and two (2) for the third column of the text matrix 151, the number of syllables per word in the sentence, indicates that the input text 110 is easy to read as having mostly short words in the sentence.

The fourth column of the text matrix 151 indicates a difference between mean sentence length 155 in number of words for all sentences in the input text 110 and the number of words for the sentence represented by the row, that is, TM[j][4]=Delta$_j$=Mean Sentence Length−TM[j][1], for the j-th sentence of the input text 110. In this specification, the difference in the number of words of one sentence from the average number of words of all sentences in the input text, which is represented in the fourth column of each sentence, is also referred to as a variation, or delta.

In block 230, the speech consumability analyzer 130 calculates the mean sentence length (MSL) 155 in a number of words for the input text 110 obtained in block 210, indicating how many words are presents in the sentences of the input text 110 on average. Then, the speech consumability analyzer 130 proceeds with block 240.

In the same embodiments presented in block 220, the speech consumability analyzer 130 calculates the mean sentence length based on the sum of all first column values from the text matrix 151 and the number of rows, that is N, in the text matrix 151. The MSL 155 is an attribute of the input text 110 as a whole, indicating an average number of words in the sentences of the input text 110. Accordingly, the MSL 155 is not represented in the text matrix 151 as each row of the text matrix 151 represents individual sentence.

$$\text{Mean Sentence Length} = \frac{\sum_j (\text{Number of words})_j}{\text{Number of sentences}} = \frac{\sum_j TM[j][1]}{N}$$

In block 240, the speech consumability analyzer 130 calculates the difference between mean sentence length 155 calculated from block 230 and the number of words for the sentence represented by each row, also referred to as variation in this specification, that is, $$TM[j][4] =$$
$$Delta_j = \text{Mean Sentence Length} - TM[j][1] = \frac{\sum_j TM[j][1]}{N} - TM[j][1],$$

for the j-th sentence of the input text 110. As noted, the respective difference values for sentences are represented in the fourth column of each row representing the sentence in the input text 110. Then, the speech consumability analyzer 130 proceeds with block 250.

In block 250, the speech consumability analyzer 130 calculates the consumability-readability score (CRS) 159 for the input text 110 obtained from block 210, based on the values of the text matrix 151 and the MSL 155 calculated from block 230. Then, the speech consumability analyzer 130 proceeds with block 260.

In certain embodiments of the present invention, the speech consumability analyzer 130 calculates the consumability-readability score 159 of the input text 110 as an average for deltas for all sentences, that is, the fourth column in the text matrix 151 as calculated from block 240. The CRS 159 for the input text 110 quantifies how each sentence has a different number of words from sentence to sentence. Accordingly, the CRS 159 is also referred to as a mean variation.

$$CRS = \frac{\sum_j Delta_j}{N} = \frac{\sum_j TM[j][4]}{N} = \frac{\sum_j (\text{Mean Sentence Length} - TM[j][1])}{N}$$

In certain embodiments of the present invention, the consumability-readability score 159 for the input text 110 represents how enjoyable the input text 110 could be in a speech form, without being difficult to understand. In the input text 110, it is understood that when the words are lengthy with more than two (2) syllables on average, readability would decrease. In utilizing the input text 110 as a script for a text-to-speech application, when the input text 110 is not easily readable, producing a speech corresponding to the input text 110 becomes more difficult and less accurate, as well as making the speech so produced based on the input text 110 more difficult to understand. As noted in FIG. 1, examples of input texts 110 with a low consumability-readability score 159 and a high consumability-readability score 159 are presented in FIGS. 3 and 4, respectively, and corresponding descriptions.

In block 260, the speech consumability analyzer 130 produces the consumability-readability score 159 for the input text 110 as calculated from block 250 to the admin 101. Then, the speech consumability analyzer 130 terminates processing the input text 110 that had been obtained in block 210.

In certain embodiments of the present invention, the speech consumability analyzer 130 is utilized in combination with a text-to-speech tool in order to predict user experience on the output speech 195 generated based on the input text 110, particularly on how enjoyable the output speech 195 would be when heard by the user 103. Accordingly, in certain embodiments of the present invention, the speech consumability analyzer 130 can be used in a screening process for the input text 110 as a candidate script for the output speech 195, and a certain threshold value for the consumability-readability score 159 can be set to determine if the output speech 195 could be produced based on the input text 110 as is or if any conversion on the input text 110 to improve the user experience with the output speech 195 would be necessary, or the input text 110 should be discarded from the pool of candidate scripts for the output speech 195.

Figure 3:
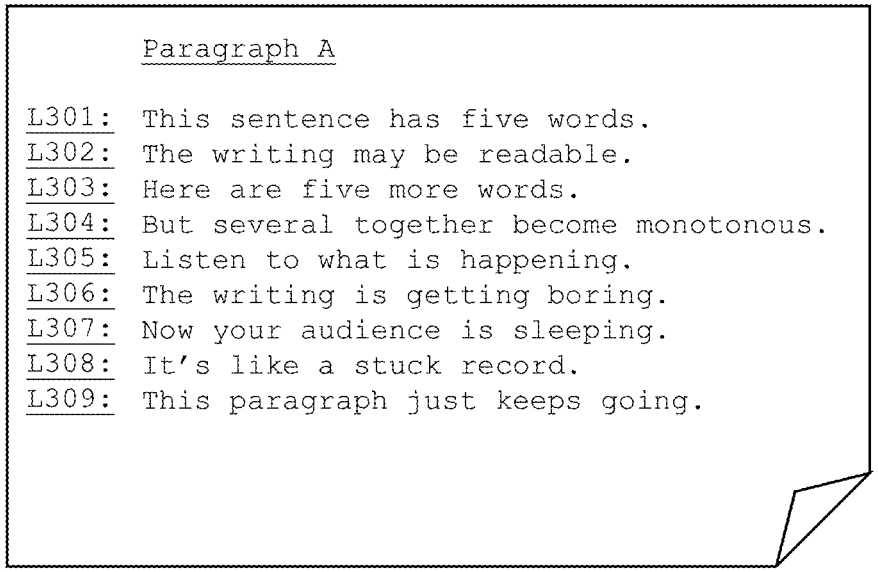
FIG. 3 depicts an exemplary input text Paragraph A, in accordance with one or more embodiments set forth herein.

FIG. 3 depicts an exemplary input text Paragraph A 300, in accordance with one or more embodiments set forth herein.

According to the conventional Flesch-Kindcaid readability test, Paragraph A 300 has a readability of 98%, indicating very easy to read.

Line L301 is a first sentence of Paragraph A 300, including five (5) words and six (6) syllables. The speech consumability analyzer 130 counts the number of words and the number of syllables in the first sentence, in block 220 of FIG. 2, and fills in the first, second, and third columns of a first row of a text matrix for Paragraph A accordingly. As noted above in block 220 of FIG. 2, the respective columns are calculated as below. A text matrix for Paragraph A, $TM_A$, is represented in column Paragraph A 300 of table 500 in FIG. 5.

$TM_A[1][1] = $ (Number of words)$_1 = 5,$ $TM_A[1][2] = $ (Number of syllables)$_1 = 6,$ and $TM_A[1][3] = $ (Number of syllables per word)$_1 = \left(\frac{TM_A[1][2]}{TM_A[1][1]}\right) = \frac{6}{5} = 1.2$ Line L302 is a second sentence of Paragraph A 300, including five (5) words and seven (7) syllables. The speech consumability analyzer 130 counts the number of words and the number of syllables in the second sentence, in block 220 of FIG. 2, and fills in the first, second, and third columns of a second row of the text matrix for Paragraph A accordingly. As noted above in block 220 of FIG. 2, the respective columns are calculated as below. The text matrix for Paragraph A, $TM_A$, is represented in column Paragraph A 300 of table 500 in FIG. 5.

$TM_A[2][1] = $ (Number of words)$_2 = 5,$ $TM_A[2][2] = $ (Number of syllables)$_2 = 7,$ and $TM_A[2][3] = $ (Number of syllables per word)$_2 = \left(\frac{TM_A[2][2]}{TM_A[2][1]}\right) = \frac{7}{5} = 1.4$ Line L303 is a third sentence of Paragraph A 300, including five (5) words and five (5) syllables. The speech consumability analyzer 130 counts the number of words and the number of syllables in the third sentence, in block 220 of FIG. 2, and fills in the first, second, and third columns of a third row of the text matrix for Paragraph A accordingly. As noted above in block 220 of FIG. 2, the respective columns are calculated as below. The text matrix for Paragraph A, $TM_A$, is represented in column Paragraph A 300 of table 500 in FIG. 5.

$TM_A[3][1] = $ (Number of words)$_3 = 5,$ $TM_A[3][2] = $ (Number of syllables)$_3 = 5,$ and $TM_A[3][3] = $ (Number of syllables per word)$_3 = \left(\frac{TM_A[3][2]}{TM_A[3][1]}\right) = \frac{5}{5} = 1$ Line L304 is a fourth sentence of Paragraph A 300, including five (5) words and thirteen (13) syllables. The speech consumability analyzer 130 counts the number of words and the number of syllables in the fourth sentence, in block 220 of FIG. 2, and fills in the first, second, and third columns of a fourth row of the text matrix for Paragraph A accordingly. As noted above in block 220 of FIG. 2, the respective columns are calculated as below. The text matrix for Paragraph A, $TM_A$, is represented in column Paragraph A 300 of table 500 in FIG. 5.

$TM_A[4][1] = $ (Number of words)$_4 = 5,$ $TM_A[4][2] = $ (Number of syllables)$_4 = 13,$ and $TM_A[4][3] = $ (Number of syllables per word)$_4 = \left(\frac{TM_A[4][2]}{TM_A[4][1]}\right) = \frac{13}{5} = 2.6$ Line L305 is a fifth sentence of Paragraph A 300, including five (5) words and eight (8) syllables. The speech consumability analyzer 130 counts the number of words and the number of syllables in the fifth sentence, in block 220 of FIG. 2, and fills in the first, second, and third columns of a fifth row of the text matrix for Paragraph A accordingly. As noted above in block 220 of FIG. 2, the respective columns are calculated as below. The text matrix for Paragraph A, $TM_A$, is represented in column Paragraph A 300 of table 500 in FIG. 5.

$TM_A[5][1] = $ (Number of words)$_5 = 5,$ $TM_A[5][2] = $ (Number of syllables)$_5 = 8,$ and $TM_A[5][3] = $ (Number of syllables per word)$_5 = \left(\frac{TM_A[5][2]}{TM_A[5][1]}\right) = \frac{8}{5} = 1.6$ Line L306 is a sixth sentence of Paragraph A 300, including five (5) words and eight (8) syllables. The speech consumability analyzer 130 counts the number of words and the number of syllables in the sixth sentence, in block 220 of FIG. 2, and fills in the first, second, and third columns of a sixth row of the text matrix for Paragraph A accordingly. As noted above in block 220 of FIG. 2, the respective columns are calculated as below. The text matrix for Paragraph A, $TM_A$, is represented in column Paragraph A 300 of table 500 in FIG. 5.

$TM_A[6][1] = $ (Number of words)$_6 = 5,$ $TM_A[6][2] = $ (Number of syllables)$_6 = 8,$ and $TM_A[6][3] = $ (Number of syllables per word)$_6 = \left(\frac{TM_A[6][2]}{TM_A[6][1]}\right) = \frac{8}{5} = 1.6$ Line L307 is a seventh sentence of Paragraph A 300, including five (5) words and seven (7) syllables. The speech consumability analyzer 130 counts the number of words and the number of syllables in the seventh sentence, in block 220 of FIG. 2, and fills in the first, second, and third columns of a seventh row of the text matrix for Paragraph A accordingly. As noted above in block 220 of FIG. 2, the respective columns are calculated as below. The text matrix for Paragraph A, $TM_A$, is represented in column Paragraph A 300 of table 500 in FIG. 5.

$TM_A[7][1] = $ (Number of words)$_7 = 5,$ $TM_A[7][2] = $ (Number of syllables)$_7 = 7,$ and $TM_A[7][3] = $ (Number of syllables per word)$_7 = \left(\frac{TM_A[7][2]}{TM_A[7][1]}\right) = \frac{7}{4} = 1.4$ Line L308 is an eighth sentence of Paragraph A 300, including five (5) words and six (6) syllables. The speech consumability analyzer 130 counts the number of words and the number of syllables in the eighth sentence, in block 220 of FIG. 2, and fills in the first, second, and third columns of an eighth row of the text matrix for Paragraph A accordingly. As noted above in block 220 of FIG. 2, the respective columns are calculated as below. The text matrix for Paragraph A, $TM_A$, is represented in column Paragraph A 300 of table 500 in FIG. 5.

$$TM_A[8][1] = \text{(Number of words)}_8 = 5,$$

$$TM_A[8][2] = \text{(Number of syllables)}_8 = 6,$$

and $$TM_A[8][3] = \text{(Number of syllables per word)}_8 = \left(\frac{TM_A[8][2]}{TM_A[8][1]}\right) = \frac{6}{5} = 1.2$$

Line L309 is a ninth and the sentence of Paragraph A 300, including five (5) words and six (6) syllables. The speech consumability analyzer 130 counts the number of words and the number of syllables in the ninth sentence, in block 220 of FIG. 2, and fills in the first, second, and third columns of the ninth row of the text matrix for Paragraph A accordingly. As noted above in block 220 of FIG. 2, the respective columns are calculated as below. The text matrix for Paragraph A, $TM_A$, is represented in column Paragraph A 300 of table 500 in FIG. 5.

$$TM_A[9][1] = \text{(Number of words)}_8 = 5,$$

$$TM_A[9][2] = \text{(Number of syllables)}_8 = 7,$$

and $$TM_A[9][3] = \text{(Number of syllables per word)}_9 = \left(\frac{TM_A[9][2]}{TM_A[9][1]}\right) = \frac{7}{5} = 1.4$$

The speech consumability analyzer 130 terminates block 220 parsing and counting Paragraph A 300, as all sentences are processed, and proceeds with block 230 of FIG. 2. The number of sentences in Paragraph A 300 is nine (9).

Figure 4:
FIG. 4 depicts another exemplary input text Paragraph B, in accordance with one or more embodiments set forth herein.

FIG. 4 depicts another exemplary input text Paragraph B 400, in accordance with one or more embodiments set forth herein;

According to the conventional Flesch-Kindcaid readability test, Paragraph B 300 has a readability of 92%, indicating very easy to read.

Line L401 is a first sentence of Paragraph B 400, including two (2) words and three (3) syllables. The speech consumability analyzer 130 counts the number of words and the number of syllables in the eighth sentence, in block 220 of FIG. 2, and fills in the first, second, and third columns of a first row of the text matrix for Paragraph B accordingly. As noted above in block 220 of FIG. 2, the respective columns are calculated as below. A text matrix for Paragraph B, $TM_B$, is represented in column Paragraph B 400 of table 500 in FIG. 5.

$$TM_B[1][1] = \text{(Number of words)}_1 = 2,$$

$$TM_B[1][2] = \text{(Number of syllables)}_1 = 3,$$

and $$TM_B[1][3] = \text{(Number of syllables per word)}_1 = \left(\frac{TM_B[1][2]}{TM_B[1][1]}\right) = \frac{2}{3} = 1.5$$

Line L402 is a second sentence of Paragraph B 400, including nine (9) words and twelve (12) syllables. The speech consumability analyzer 130 counts the number of words and the number of syllables in the second sentence, in block 220 of FIG. 2, and fills in the first, second, and third columns of a second row of the text matrix for Paragraph B accordingly. As noted above in block 220 of FIG. 2, the respective columns are calculated as below. The text matrix for Paragraph B, $TM_B$, is represented in column Paragraph B 400 of table 500 in FIG. 5.

$$TM_B[2][1] = \text{(Number of words)}_2 = 9,$$

$$TM_B[2][2] = \text{(Number of syllables)}_2 = 12,$$

and $$TM_B[2][3] = \text{(Number of syllables per word)}_2 = \left(\frac{TM_B[2][2]}{TM_B[2][1]}\right) = \frac{12}{9} = 1.3$$

Line L403 is a third sentence of Paragraph B 400, including one (1) word and two (2) syllables. The speech consumability analyzer 130 counts the number of words and the number of syllables in the third sentence, in block 220 of FIG. 2, and fills in the first, second, and third columns of a third row of the text matrix for Paragraph B accordingly. As noted above in block 220 of FIG. 2, the respective columns are calculated as below. The text matrix for Paragraph B, $TM_B$, is represented in column Paragraph B 400 of table 500 in FIG. 5.

$$TM_B[3][1] = \text{(Number of words)}_3 = 1,$$

$$TM_B[3][2] = \text{(Number of syllables)}_3 = 2,$$

and $$TM_B[3][3] = \text{(Number of syllables per word)}_3 = \left(\frac{TM_B[3][2]}{TM_B[3][1]}\right) = \frac{2}{1} = 2$$

Line L404 is a fourth sentence of Paragraph B 400, including three (3) words and four (4) syllables. The speech consumability analyzer 130 counts the number of words and the number of syllables in the fourth sentence, in block 220 of FIG. 2, and fills in the first, second, and third columns of a fourth row of the text matrix for Paragraph B accordingly. As noted above in block 220 of FIG. 2, the respective columns are calculated as below. The text matrix for Paragraph B, $TM_B$, is represented in column Paragraph B 400 of table 500 in FIG. 5.

$$TM_B[4][1] = \text{(Number of words)}_4 = 3,$$

$$TM_B[4][2] = \text{(Number of syllables)}_4 = 4,$$

and $$TM_B[4][3] = \text{(Number of syllables per word)}_4 = \left(\frac{TM_B[4][2]}{TM_B[4][1]}\right) = \frac{4}{3} = 1.3$$

Line L405 is a fifth sentence of Paragraph B 400, including nine (9) words and thirteen (13) syllables. The speech consumability analyzer 130 counts the number of words and the number of syllables in the fifth sentence, in block 220 of FIG. 2, and fills in the first, second, and third columns of a fifth row of the text matrix for Paragraph B accordingly. As noted above in block 220 of FIG. 2, the respective columns are calculated as below. The text matrix for Paragraph B, $TM_B$, is represented in column Paragraph B 400 of table 500 in FIG. 5.

$$TM_B[5][1] = \text{(Number of words)}_5 = 9,$$

$$TM_B[5][2] = \text{(Number of syllables)}_5 = 13,$$

and $$TM_B[5][3] = \text{(Number of syllables per word)}_5 = \left(\frac{TM_B[5][2]}{TM_B[5][1]}\right) = \frac{13}{9} = 1.4$$

Line L406 is a sixth sentence of Paragraph B 400, including four (4) words and six (6) syllables. The speech consumability analyzer 130 counts the number of words and the number of syllables in the sixth sentence, in block 220 of FIG. 2, and fills in the first, second, and third columns of a sixth row of the text matrix for Paragraph B accordingly. As noted above in block 220 of FIG. 2, the respective columns are calculated as below. The text matrix for Paragraph B, $TM_B$, is represented in column Paragraph B 400 of table 500 in FIG. 5.

$$TM_B[6][1] = \text{(Number of words)}_6 = 4,$$

$$TM_B[6][2] = \text{(Number of syllables)}_6 = 6,$$

and $$TM_B[6][3] = \text{(Number of syllables per word)}_6 = \left(\frac{TM_B[6][2]}{TM_B[6][1]}\right) = \frac{6}{4} = 1.5$$

Line L407 is a seventh sentence of Paragraph B 400, including seven (7) words and eleven (11) syllables. The speech consumability analyzer 130 counts the number of words and the number of syllables in the seventh sentence, in block 220 of FIG. 2, and fills in the first, second, and third columns of a seventh row of the text matrix for Paragraph B accordingly. As noted above in block 220 of FIG. 2, the respective columns are calculated as below. The text matrix for Paragraph B, $TM_B$, is represented in column Paragraph B 400 of table 500 in FIG. 5.

$$TM_B[7][1] = \text{(Number of words)}_7 = 7,$$

$$TM_B[7][2] = \text{(Number of syllables)}_7 = 11,$$

and $$TM_B[7][3] = \text{(Number of syllables per word)}_7 = \left(\frac{TM_B[7][2]}{TM_B[7][1]}\right) = \frac{11}{7} = 1.5$$

Line L408 is an eighth and the last sentence of Paragraph B 400, including twenty (20) words and thirty-one (31) syllables. The speech consumability analyzer 130 counts the number of words and the number of syllables in the eighth sentence, in block 220 of FIG. 2, and fills in the first, second, and third columns of a eighth row of the text matrix for Paragraph B accordingly. As noted above in block 220 of FIG. 2, the respective columns are calculated as below. The text matrix for Paragraph B, $TM_B$, is represented in column Paragraph B 400 of table 500 in FIG. 5.

$$TM_B[8][1] = \text{(Number of words)}_8 = 20,$$

$$TM_B[8][2] = \text{(Number of syllables)}_8 = 31,$$

and $$TM_B[8][3] = \text{(Number of syllables per word)}_8 = \left(\frac{TM_B[8][2]}{TM_B[8][1]}\right) = \frac{31}{20} = 1.5$$

The speech consumability analyzer 130 terminates block 220 parsing and counting Paragraph B 400, as all sentences are processed, and proceeds with block 230 of FIG. 2. The number of sentences in Paragraph B 400 is eight (8).

Figure 5:
FIG. 5 depicts respective outcomes of Paragraph A of FIG. 3 and Paragraph B of FIG. 4, as processed by the speech consumability analyzer, in accordance with one or more embodiments set forth herein.

FIG. 5 depicts respective outcomes of Paragraph A 300 of FIG. 3 and Paragraph B 400 of FIG. 4, as processed by the speech consumability analyzer 130, in accordance with one or more embodiments set forth herein;

At the end of block 220, the speech consumability analyzer 130 fills the first, second, and third columns of the respective text matrices $TM_A$ and $TM_B$, as described in FIGS. 3 and 4. As shown in respective third columns of the respective text matrices $TM_A$ and $TM_B$, Paragraph A 300 and Paragraph B 400 are of similar readability with words having between one (1) to two (2) syllables on average.

In block 230, the speech consumability analyzer 130 calculates a mean sentence length (MSL) in the number of words, that is, $$\left(\frac{\text{total words}}{\text{total sentences}}\right).$$

For Paragraph A 300, the MSL is $$\frac{5 \times 9}{9} = 5,$$

as all nine sentences have five (5) words, respectively. The MSL of Paragraph B 400 is calculated as:

$$\frac{2+9+1+3+9+4+7+20 = 55}{8} = 6.9,$$

where rounded from the second digit below decimal point. The respective results are presented in the row MSL of table 500.

In block 240, the speech consumability analyzer 130 calculates a variation with the sentence lengths of each sentence and fills in the fourth column of the text matrix.

For Paragraph A 300, as all sentences of Paragraph A 300 are of the same lengths of five (5), the variation from the MSL of Paragraph A 300 is zero (0) for all sentences, as presented in the fourth column of $TM_A$. As variations are all valued at zero (0), the Mean Variation indicating the consumability-readability score (CRS) 159 for Paragraph A 300 is zero (0). Although Paragraph A 300 is very easy to read, Paragraph A 300 would not be a good script to produce an output speech, because Paragraph A 300 is monotonous with no engaging features for the users 103.

For Paragraph B 400, the variation for each sentence is calculated according to the formula presented in FIG. 2:

$$TM_B[j][4]=Delta_j=MSL_B-TM_B[j][1]$$

where $MSL_B=6.9$. The respective results are presented in the fourth column of the text matrix for Paragraph B, $TM_B$ in FIG. 5. Accordingly, the Mean Variation indicating the consumability-readability score (CRS) 159 for Paragraph B 400 is calculated as:

$$\frac{4.9-2.1+5.9+3.9-2.1+2.9-0.1+13.1=26.4}{8}=3.3$$

The CRS 159 for Paragraph B 400 of 3.3 indicates that Paragraph B 400 is engaging and will be able to keep the user 103 interested in listening to the output speech 195.

In certain embodiments of the present invention, the speech consumability analyzer 130 calculates the Mean Variation indicating the consumability-readability score (CRS) 159 based on respective quantities, that is, absolute values, of the variations, in order to reflect the individual variation from the MSL of each sentence more accurately, without offsetting the sentence-to-sentence changes by subtractions and additions. In the same embodiment of the present invention, the Mean Variation indicating the consumability-readability score (CRS) 159 for Paragraph B 400 would be:

$$\frac{4.9+2.1+5.9+3.9+2.1+2.9+0.1+13.1=35.0}{8}=4.375,$$

which is enhanced from the formulation of the CRS 159 presented in table 500.

In certain embodiments of the present invention, the speech consumability analyzer 130 calculates the consumability-readability score (CRS) 159 by multiplying the Flesh reading-ease score (FRES) as normalized by percentile, that is, FRES/100, such that the CRS 159 can represent a combination of both the consumability and the readability of the input text 110, without presenting the text matrix 151 corresponding to the input text 110.

Certain embodiments of the present invention automatically generates a consumability-readability score for an input text, which indicates how easy to understand and engaging an output speech would be, when produced from the input text. Certain embodiments of the present invention offers a method to filter certain input texts out based on a certain threshold value for the consumability-readability score of the input texts, in order to improve user experience with speech products generated from the input texts by use of text-to-speech tools. Certain embodiments of the present invention further supports an option to convert any input text below a threshold value for the consumability-readability score to another text that is semantically similar to the input text but with an improved consumability-readability score by use of natural language processing tools, to ensure better user experience with the output speech produced based on the text. Certain embodiments of the present invention improves utilization of the text-to-speech tools and the natural language processing tools by assessing user experience of audio products prior to actually producing the audio products by analyzing speech consumability of script text, that is, the input text, for the audio products Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The consumability-conscious text-to-speech system can provide the speech consumability analysis service separately or in combination with the text-to-speech service, based on types of subscription, to interested users, business entities, and vendors of text-based audio products in need from any location in the world.

Figure 6:
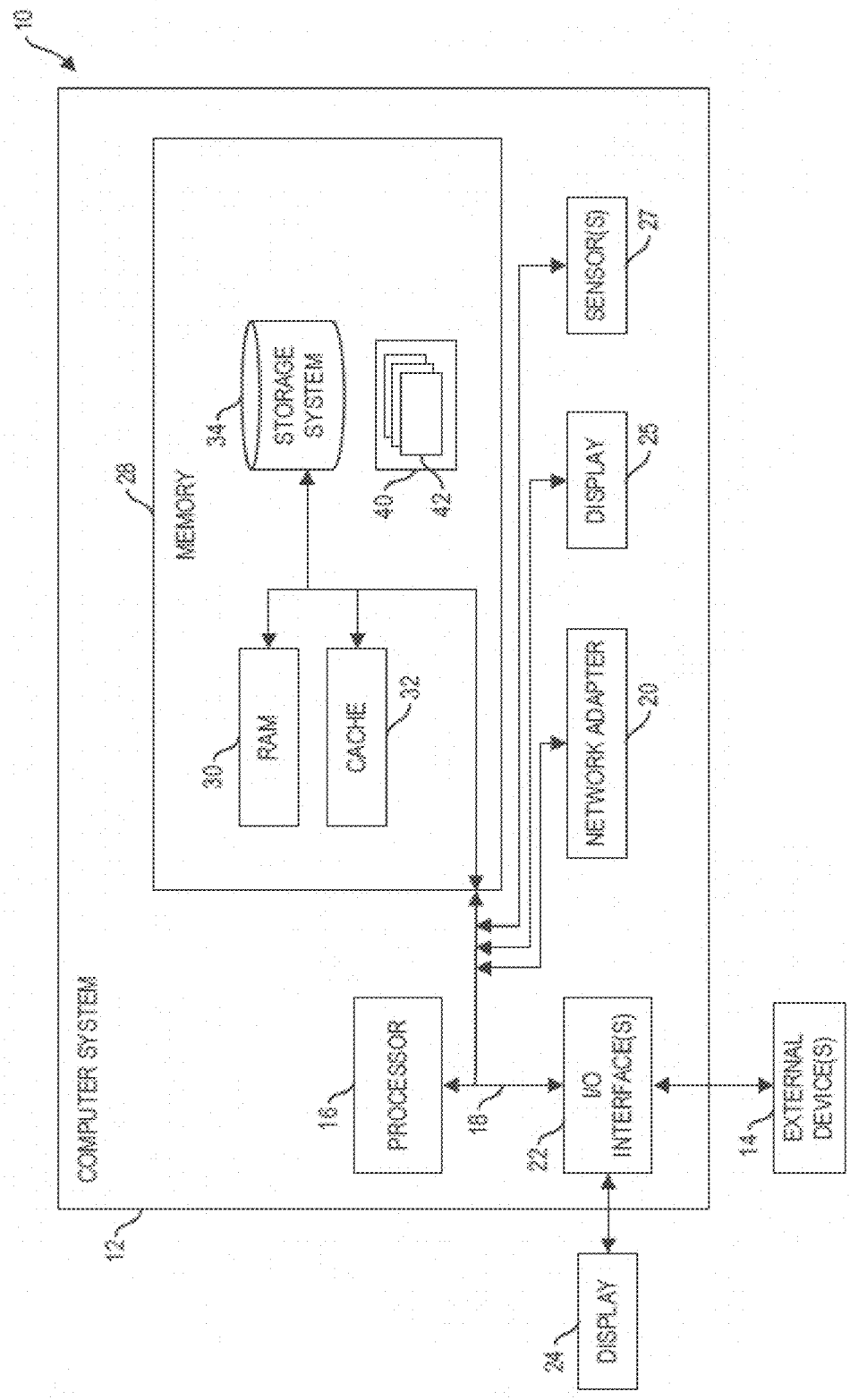
FIG. 6 depicts a cloud computing node according to an embodiment of the present invention.
Figure 7:
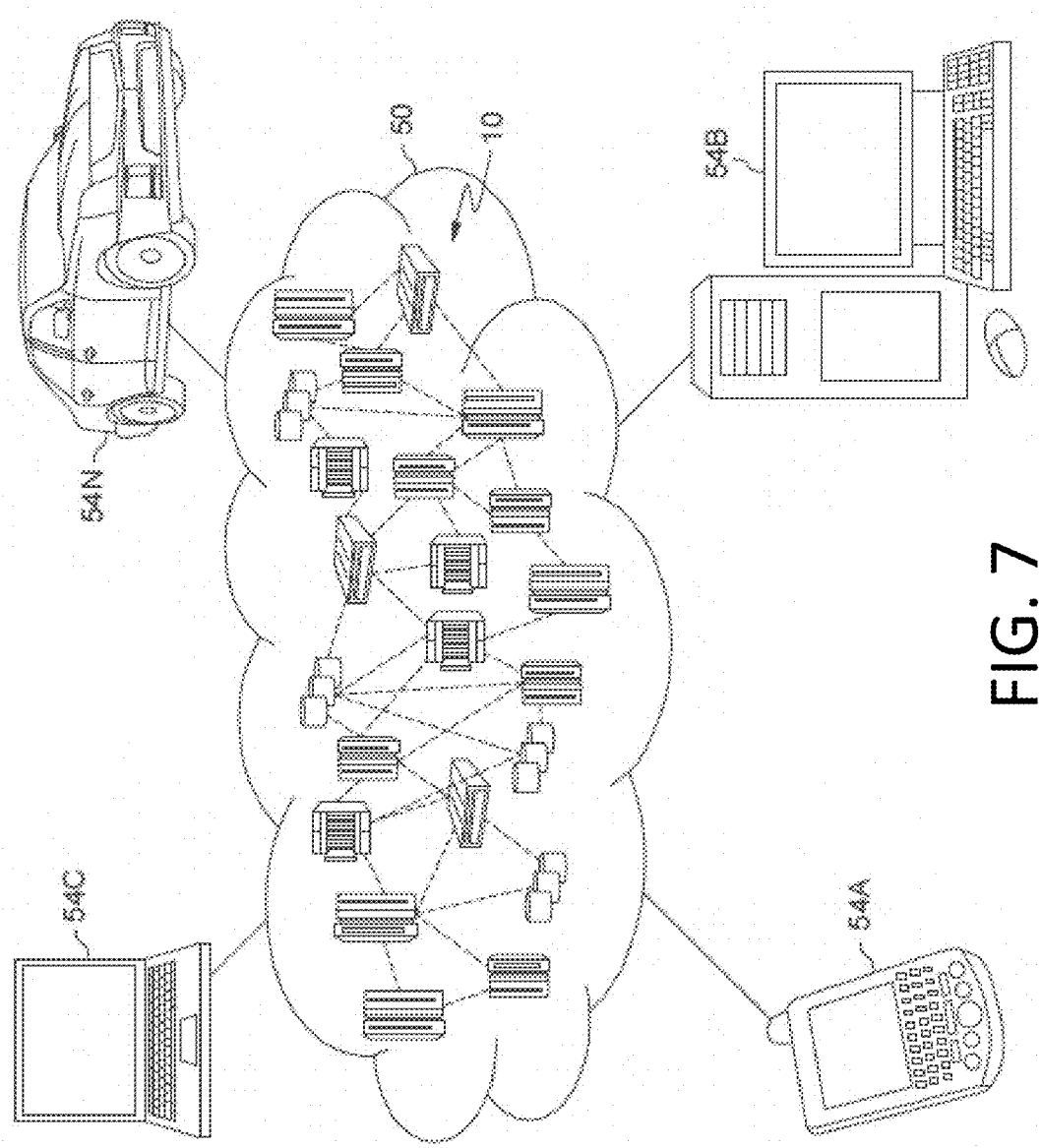
FIG. 7 depicts a cloud computing environment according to an embodiment of the present invention.
Figure 8:
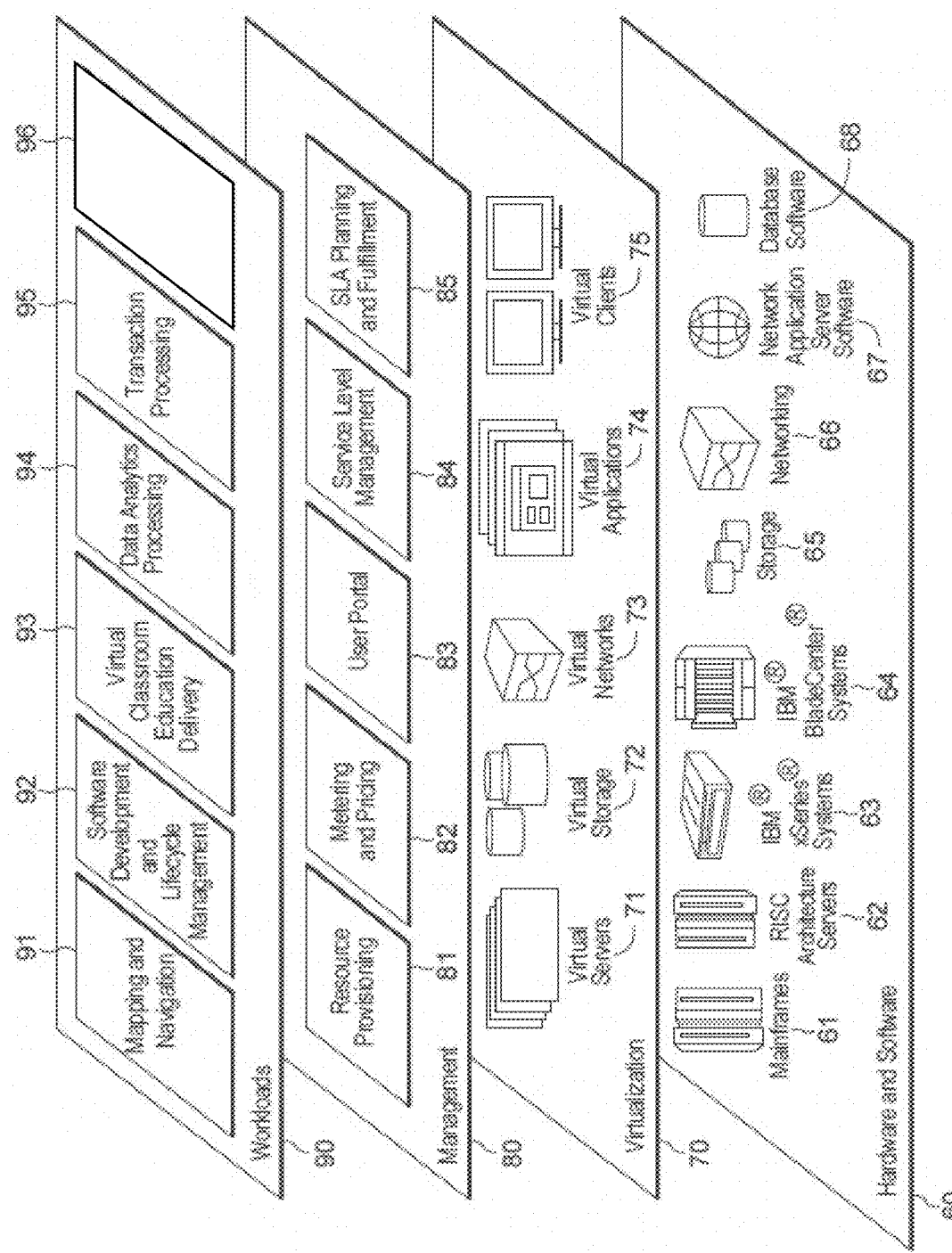
FIG. 8 depicts abstraction model layers according to an embodiment of the present invention.

FIGS. 6-8 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the speech consumability analyzer 130 and the consumability-conscious text-to-speech system 120 of FIG. 1, respectively. Program processes 42, as in the speech consumability analyzer 130, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the consumability-conscious text-to-speech system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining, by one or more processor, an input text, wherein the input text is a script for an output speech;
    counting, by the one or more processor, a number of words in a sentence and a number of syllables in the sentence, for each sentence in the input text;
    calculating, by the one or more processor, a mean sentence length of the input text as an average number of words in sentences of the input text;
    calculating, by the one or more processor, respective variations in sentence lengths for all of the sentences, by subtracting the number of words in each of the sentences from the mean sentence length of the input text;
    producing, by the one or more processor, a consumability-readability score of the input text, as an average of the respective variations for all of the sentences in the input text, wherein the consumability-readability score indicates a level of satisfaction for listeners of the output speech based on the input text; and
    generating, by the one or more processor, by use of a text-to-speech tool, the output speech based on the input text, based on a preconfigured threshold value for the consumability-readability score of the input text and directives on how to generate the output speech corresponding to a value of the consumability-readability score.

2. The computer implemented method of claim 1, the generating comprising:
    determining that the consumability-readability score of the input text is less than the preconfigured threshold value; and
    discarding the input text from candidate scripts for output speeches.

3. The computer implemented method of claim 1, the generating comprising:
    determining that the consumability-readability score of the input text is less than the preconfigured threshold value;
    generating a control signal based on the consumability-readability score; and
    outputting the control signal to control conversion of the input text to another text semantically similar to the input text in order to improve the consumability-readability score.

4. The computer implemented method of claim 1, the generating comprising:
    determining that the consumability-readability score of the input text is greater than or equal to the preconfigured threshold value; and
    generating the output speech based on the input text.

5. The computer implemented method of claim 1, further comprising:
    forming a text matrix for the input text, where rows of the text matrix respectively represent the sentences of the input text in order of appearance, the forming comprising:
        instantiating a first column of a row with the number of words in a sentence corresponding to the row;
        instantiating a second column of the row with the number of syllables in the sentence corresponding to the row;
        instantiating a third column of the row with the number of syllables per word in the sentence corresponding to the row; and
        instantiating a fourth column of the row with a difference between the mean sentence length of the input text and the number of words in the sentence corresponding to the row as represented in the first column of the row.

6. The computer implemented method of claim 5, wherein values in the third column of the text matrix between one (1) and two (2), representing the number of syllables per word in each of the sentences, respectively indicate that each of the sentences represented by each row is easy to read as having relatively short words.

7. The computer implemented method of claim 1, further comprising:
    calculating a conventional readability score of the input text; and
    producing the consumability-readability score as multiplied by the conventional readability score in order to reflect a measure of conventional readability in the consumability-readability score.

8. The computer implemented method of claim 7, wherein the conventional readability score employed is the Flesch Reading Ease Score, denoted as FRES, calculated according to a known formula, and then normalized by percentile, that is, FRES/100.

9. A computer program product comprising:
    a computer readable storage medium readable by one or more processor and storing instructions for execution by the one or more processor for performing a method comprising:
        obtaining an input text, wherein the input text is a script for an output speech;
        counting a number of words in a sentence and a number of syllables in the sentence, for each sentence in the input text;
        calculating a mean sentence length of the input text as an average number of words in sentences of the input text;
        calculating respective variations in sentence lengths for all of the sentences, by subtracting the number of words in each of the sentences from the mean sentence length of the input text;
        producing a consumability-readability score of the input text, as an average of variations for all of the sentences in the input text, wherein the consumability-readability score indicates a level of satisfaction for listeners of the output speech based on the input text; and
        updating, by the one or more processor, a text evaluation references database coupled to the one or more processor with a plurality of text evaluation references automatically obtained from data mining and a plurality of consumability-readability scores respectively corresponding to each of the text evaluation references to thereby ascertain a threshold value for the consumability-readability score of the input text in generating the output speech based on the input text.

10. The computer program product of claim 9, further comprising:
    determining that the consumability-readability score of the input text is less than the threshold value; and
    discarding the input text from candidate scripts for output speeches.

11. The computer program product of claim 9, further comprising:
    determining that the consumability-readability score of the input text is less than the threshold value;
    generating a control signal based on the consumability-readability score; and
    outputting the control signal to control conversion of the input text to another text semantically similar to the input text in order to improve the consumability-readability score.

12. The computer program product of claim 9, further comprising:
    determining that the consumability-readability score of the input text is greater than or equal to the threshold value; and
    generating the output speech based on the input text.

13. The computer program product of claim 9, further comprising:
    forming a text matrix for the input text, where rows of the text matrix respectively represent the sentences of the input text in order of appearance, the forming comprising:
        instantiating a first column of a row with the number of words in a sentence corresponding to the row;
        instantiating a second column of the row with the number of syllables in the sentence corresponding to the row;
        instantiating a third column of the row with the number of syllables per word in the sentence corresponding to the row; and
        instantiating a fourth column of the row with a difference between the mean sentence length of the input text and the number of words in the sentence corresponding to the row as represented in the first column of the row.

14. The computer program product of claim 13, wherein values in the third column of the text matrix between one (1) and two (2), representing the number of syllables per word in each of the sentences, respectively indicate that each of the sentences represented by each row is easy to read as having relatively short words.

15. The computer program product of claim 9, further comprising:
    calculating a conventional readability score of the input text; and
    producing the consumability-readability score as multiplied by the conventional readability score in order to reflect a measure of conventional readability in the consumability-readability score.

16. The computer program product of claim 15, wherein the conventional readability score employed is the Flesch Reading Ease Score, denoted as FRES, calculated according to a known formula, and then normalized by percentile, that is, FRES/100.

17. A system comprising:
    a memory;
    one or more processor in communication with memory; and
    program instructions executable by the one or more processor via the memory to perform a method comprising:
    obtaining an input text, wherein the input text is a script for an output speech;
    counting a number of words in a sentence and a number of syllables in the sentence, for each sentence in the input text;
    calculating a mean sentence length of the input text as an average number of words in sentences of the input text;
    calculating respective variations in sentence lengths for all of the sentences, by subtracting the number of words in each of the sentences from the mean sentence length of the input text;
    producing a consumability-readability score of the input text, as an average of variations for all of the sentences in the input text, wherein the consumability-readability score indicates a level of satisfaction for listeners of the output speech based on the input text; and
    generating, by use of a text-to-speech tool, the output speech corresponding to the input text, in accordance with directives on how to generate the output speech based on a preconfigured threshold value for the consumability-readability score of the input text.

18. The system of claim 17, the generating comprising:
    determining that the consumability-readability score of the input text is less than the preconfigured threshold value; and
    discarding the input text from candidate scripts for output speeches.

19. The system of claim 17, further the generating comprising:
    determining that the consumability-readability score of the input text is less than the preconfigured threshold value;
    generating a control signal based on the consumability-readability score; and
    outputting the control signal to control conversion of the input text to another text semantically similar to the input text in order to improve the consumability-readability score.

20. The system of claim 17, the generating comprising:
    determining that the consumability-readability score of the input text is greater than or equal to the preconfigured threshold value; and
    generating the output speech based on the input text.

21. The system of claim 17, further comprising:
    forming a text matrix for the input text, where rows of the text matrix respectively represent the sentences of the input text in order of appearance, the forming comprising:
        instantiating a first column of a row with the number of words in a sentence corresponding to the row;
        instantiating a second column of the row with the number of syllables in the sentence corresponding to the row;
        instantiating a third column of the row with the number of syllables per word in the sentence corresponding to the row; and
        instantiating a fourth column of the row with a difference between the mean sentence length of the input text and the number of words in the sentence corresponding to the row as represented in the first column of the row.

22. The system of claim 17, further comprising:
calculating a conventional readability score of the input text; and
producing the consumability-readability score as multiplied by the conventional readability score in order to reflech a measure of conventional readability in the consumability-readability score.

23. The computer implemented method of claim 1, further comprising:
updating a text evaluation references database coupled to the one or more processor with a plurality of text evaluation references automatically obtained from data mining and a plurality of consumability-readability scores respectively corresponding to each of the text evaluation references; and
determining the preconfigured threshold value for the consumability-readability score of the input text to meet to generate the output speech by use of the text-to-speech tool based on the input text.

24. The computer program product of claim 9, further comprising:
generating, by use of a text-to-speech tool, the output speech based on the input text, based on a the threshold value for the consumability-readability score of the input text and directives on how to generate the output speech corresponding to a value of the consumability-readability score, the generating comprising:
ascertaining that the consumability-readability score of the input test corresponds to discarding the input text from candidate scripts for output speeches, and subsequently discarding the input text;
ascertaining that the consumability-readability score of the input test corresponds to a conversion of the input text to another text semantically similar to the input text in order to improve the consumability-readability score, and subsequently generating the output speech based on a converted input text; and
ascertaining that the consumability-readability score of the input test corresponds to generating the output speech based on the input text, and subsequently generating then output speech based on the input text.

25. The system of claim 17, further comprising:
updating a text evaluation references database coupled to the one or more processor with a plurality of text evaluation references automatically obtained from data mining and a plurality of consumability-readability scores respectively corresponding to each of the text evaluation references; and
determining the preconfigured threshold value for the consumability-readability score of the input text to meet to generate the output speech by use of the text-to-speech tool based on the input text.

* * * * *